Jan. 6, 1953 L. E. FEAL 2,624,229
CAMERA VIEW FINDER
Filed Oct. 11, 1949 3 Sheets-Sheet 1
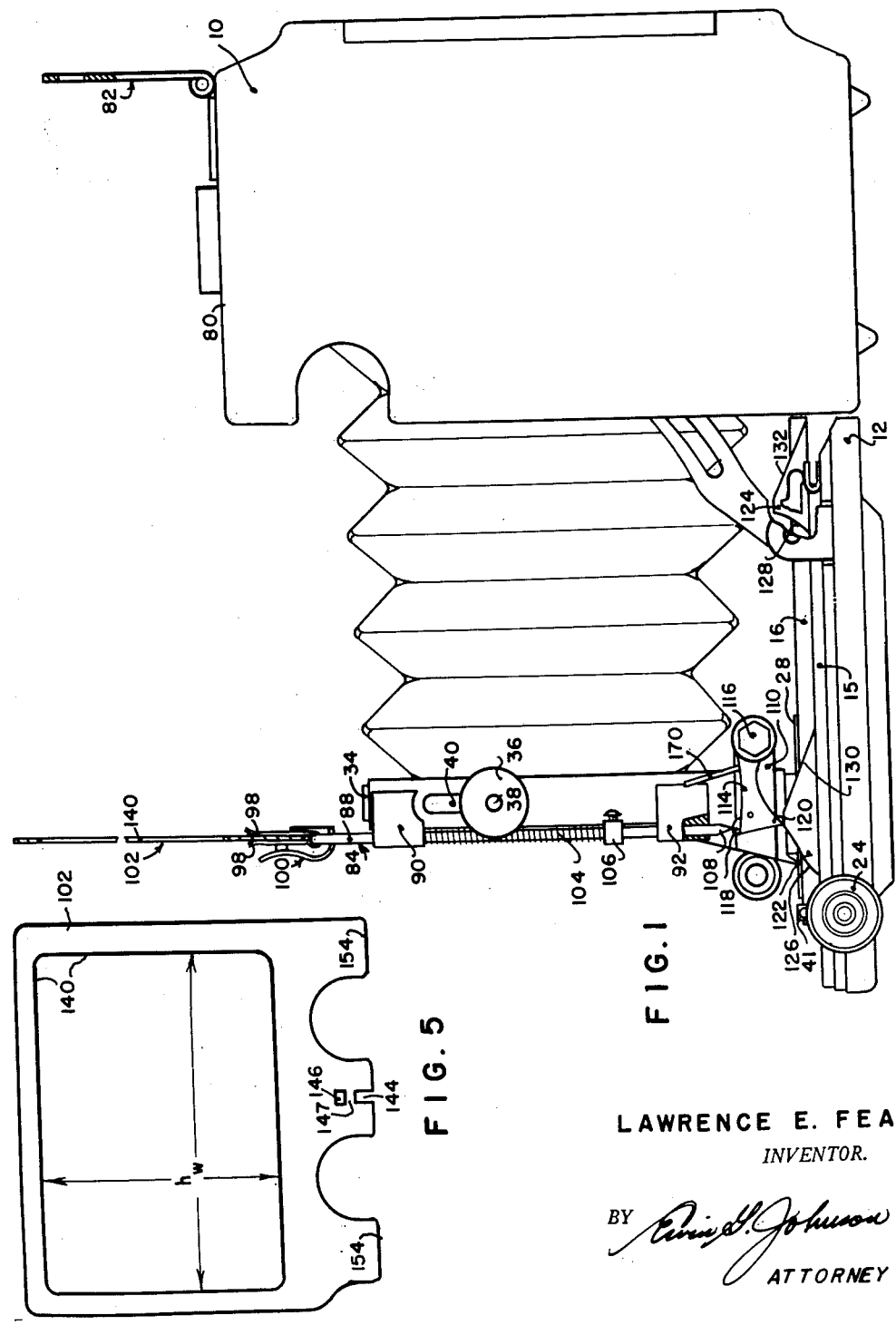
LAWRENCE E. FEAL
*INVENTOR.*
BY *Ervin G. Johnson*
*ATTORNEY*

Jan. 6, 1953  L. E. FEAL  2,624,229
CAMERA VIEW FINDER
Filed Oct. 11, 1949  3 Sheets-Sheet 2
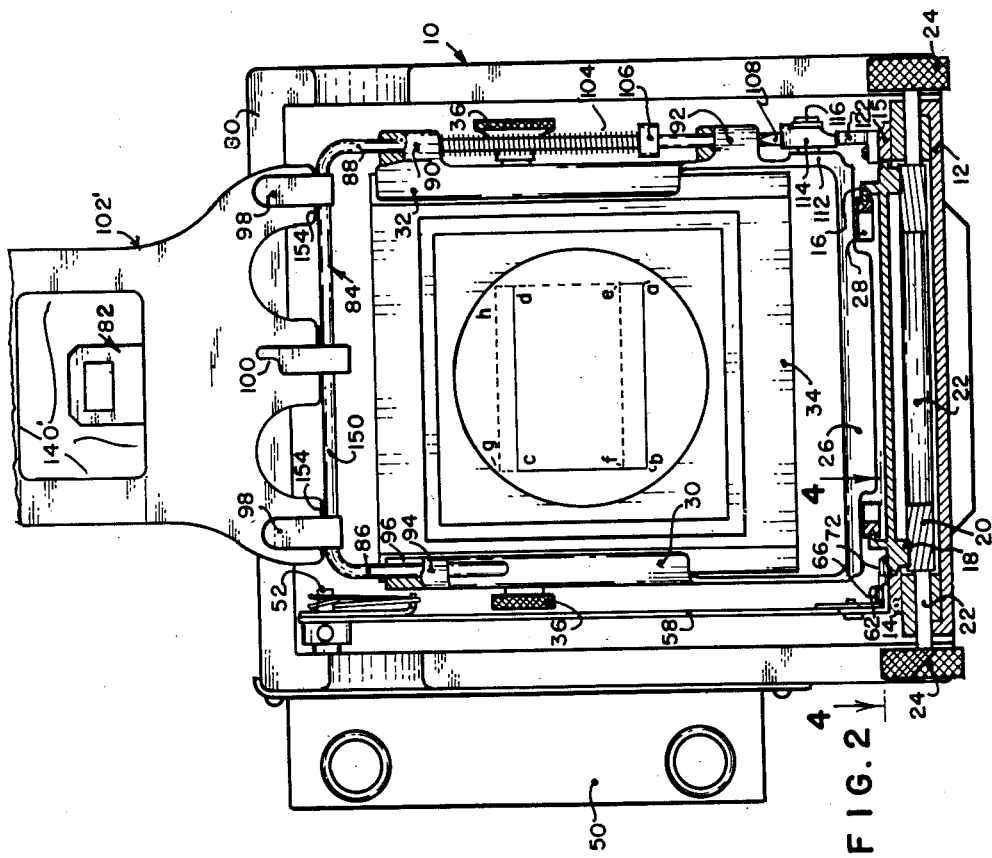
LAWRENCE E. FEAL
INVENTOR.
BY
ATTORNEY Jan. 6, 1953 — L. E. FEAL — 2,624,229
CAMERA VIEW FINDER
Filed Oct. 11, 1949 — 3 Sheets-Sheet 3
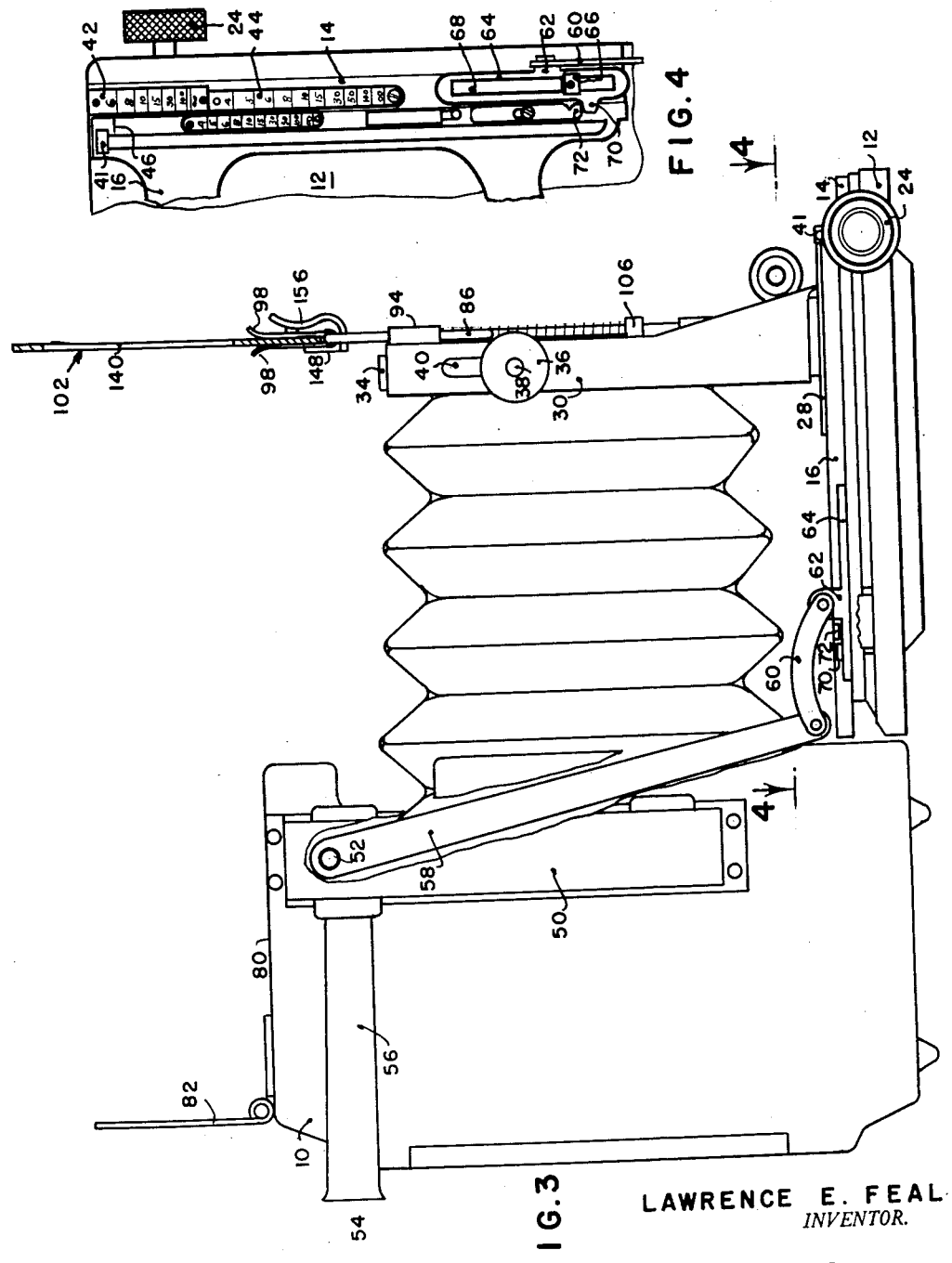
LAWRENCE E. FEAL
INVENTOR.
BY *Ewis H. Johnson*
ATTORNEY Patented Jan. 6, 1953

2,624,229

UNITED STATES PATENT OFFICE 2,624,229

CAMERA VIEW FINDER

Lawrence E. Feal, Oakland, Calif.

Application October 11, 1949, Serial No. 120,778

2 Claims. (Cl. 88—1.5)

This invention relates to cameras and to a device by which an area in a scene to be photographed is exactly and visibly defined for the photographer so that he can with certainty know precisely what area of the scene he has selected will appear on the sensitized film to be exposed.

The types of devices heretofore known whose functions have included, as a general objective, the visual determination by the photographer of what area it is that is being photographed upon operation of the camera shutter, have certain undesirable characteristics some of which are overcome by the devices here to be described.

The device of my invention serves the purpose of a wire type view finder. This type of finder has several advantages over what may be termed optical or lens view finders. One of the greater advantages is that the field of view for the photographer is unlimited; that is to say, he can see simultaneously the environment surrounding the center of interest over a wide angular range. This is especially advantageous in action shots at relatively close range.

It is one of the main objects of my invention to provide a device which serves the purpose of the wire-type view finder, but which also makes it possible for the photographer to see the precise boundaries of the scene the image of which will appear on the film.

Another function of my invention is to so provide that the edge of the area so precisely seen shall be reproduced with its boundaries in substantially exact registration with the edges of the predetermined area of the film upon which the image is to be reproduced. Exact registration of the desired scene with the usable portions of some sensitized films is frequently of great importance, notably where the film is used for projection and is masked in standard mounts. In the development and mounting of such films at low cost no attention can be given to shifting the image on the film so that certain elements of the image will, after masking, be projected onto a screen. It is, therefore, necessary that the scene desired be properly registered on the film at the time of exposure.

An additional function of my invention relates to the exposure of film areas of different dimensions, using (1) precisely the same optical system, and (2) using the same camera with different optical systems or lenses. In addition to the basic film size for which any particular camera may be constructed, such camera may be modified by the addition of certain types of film adapters so that films of smaller dimensions, and even of different shape, may be exposed in the same camera. In order to obtain correct registration at any range, I provide (1) a separate view finder with each adapter and (2) a distinct view finder for each lens to be used with that adapter. In using my invention it is practical to film precisely the area required at any distance on any area of the camera's basic film area, or on any defined area within the basic film area, with readily interchangeable camera accessories herein to be described.

In addition to the foregoing principal advantages, my invention further includes certain operational advantages, one of which is that the combined features automatically achieve exact registration at any range.

In the preferred embodiment the invention is applied to what is commonly referred to as the press type camera. This camera as heretofore known, is often equipped with a range finding device of the optical or coincidence type wherein two images or sections of images are brought to coincidence or alignment to determine the range. The adjusting devices sometimes include distance calibrations so that the distance to the object desired to be photographed is readable.

In addition, however, the range finder for this type of camera is often provided with a linkage such that the traversing of the lens board is synchronized with the adjustment of the range finder so that when coincidence occurs the camera lens is adjusted to focus the scene on the film.

It is in combination with this relatively modern apparatus that I apply my invention with the result that not only are the advantages of my invention in its basic concepts obtained, but they are obtained with a minimum of effort by the photographer and in addition they are obtained in conjunction with the highly desirable functions of the synchronized range finder and other advantageous features of the type of camera referred to.

Certain of the features of advantage of my invention overcome errors due to what is termed parallax. These errors in locating a scene on a film arise because the photographer views the scene along an axis of vision different from the optical axis of the camera by a small angle at the scene to be photographed.

Other objects and advantages of my invention will become evident in the following specification and accompanying drawing, wherein:

Fig. 1 is a side elevation of an open camera;

Fig. 2 is a front elevation with a different view finder;

Fig. 3 is a side elevation from the left of Fig. 2;

Fig. 4 is a partial view as seen from planes 4—4 of Figs. 2 and 3;

Fig. 5 is an elevation showing one of several view finders;

Figs. 6, 7, 8 and 9 show details of a view finder attaching device.

The camera shown in Figs. 1 to 4 inclusive comprises parts the majority of which are known in the prior art to be used in the same way as illustrated. The omission of description of such parts in detail in this specification facilitates, it is believed, the understanding of this invention.

The camera comprises a housing 10 having a camera front board 12 which hinges to the housing by a hinge structure which is not shown. The front board provides track guide rails 14 and 15 between which there is slidably mounted the camera front board track 16. Track 16 is provided with racks 18 meshing with pinions 20 formed on shaft 22 for driving by thumb-pieces 24. A lens board support 26 is releasably and slidably secured on tracks 16 by track shoes 28. Camera lens board support 26 comprises a pair of upright lens board slide rails 30 and 32 slidably receiving the lens board 34. Thumb nuts 36 engage suitable screws 38 mounted in lens board 34 and extend through slots 40 in the lens board side rails 30 and 32, to clamp or release the board 34 for vertical adjustment.

There may be mounted on the track guide rails 14 and 15 the usual stops 41 and range scales 42 and/or the vernier type range scale 44 properly related to the reference mark 46 and/or to the vernier scale 48 respectively on the adjacent track 16.

A range finding device 50 is mounted upon the side of housing 10 and extends a shaft 52 through the housing wall to a point in a plane of rotation juxtaposed to the plane of opening and closing rotation of rail 14. Rotation of shaft 52 effects adjustment of the images in range finder 50, the condition of coincidence being effected by the eye and hand from a point 54, the tube 56 forming part of the range finder 50. A lever 58 is secured at one end to rotate shaft 52 and at the other end to a link 60. Link 60 is in turn pivoted to an ear 62 of a slide member 64 which is mounted on the rail 14 to slide in the direction of the rail, being confined to such sliding motion by a suitable guide 66 engaging slot 68 in member 64 and secured in rail 14. The slide member 64 further includes a lug 70 which extend inwardly to a point over the track 16. Mounted on the track 16 there is a finger 72 which engages lug 70 when tracks 16 are reciprocated to adjust the depth of the lens board. In this way rotation of thumb pieces 24 causes the lens board 34 and the lever 58 to move simultaneously in the range of focal adjustment within infinity so that when the range finder 50 indicates the condition for coincidence the lens (not shown) on the lens board is in the proper position to focus the image of the scene on the film area. A suitable spring is provided to effect return of the lever 58 upon withdrawal (outward movement) of finger 72 from its engagement with lug 70.

The construction described to this point is a part of the prior art. Before describing the additional devices which operate in conjunction with the apparatus described above, the problems solved by this invention will now be discussed with reference to Figs. 1 and 2.

The finder 102 of Fig. 1 has an opening or window of such dimensions $h$ and $w$ that it can be positioned to provide exact registration of the image of the viewed scene on the film of basic size of the camera. The finder 102' of Fig. 2 is of such dimensions that it can be positioned to provide exact registration of the image of the viewed scene on a much smaller film area $abcd$. Area $abcd$ corresponds, for example, to the size of a film to be used for projection. Such films may be mounted for exposure in camera 10 by the use of certain adapters which it is unnecessary here to describe, but it will be appreciated that any such adapter preferably places the center of the film area $abcd$ on the optical axis of the camera lens. In Fig. 2 it is the function of the view finder 102' operating in conjunction with other apparatus to be described, to cause registration of the image described at any range. In Fig. 1 it is the function of view finder 102 acting in conjunction with the same other apparatus to cause registration of the desired view at any range with the basic film size of the camera.

In Fig. 2 the area $efgh$ between dotted line segments $ef$ and $gh$ illustrates an error in registration due to parallax of the view finder if correction is not effected. The position of area $efgh$ changes with the range up or down in the direction of the vertical axis, and the means by which the correct adjustment of the view finder at all ranges is effected is accordingly a variable means as will be described. It will be appreciated, referring to Fig. 1, that a similar lack of registration on the basic film occurs due to parallax if no correction is applied.

Referring to Fig. 5, it is at times convenient to have the ratio of $h$ to $w$ the same as the ratio of the corresponding film dimensions. However, it is not necessary to have it so. It is generally sufficient that the mid-point of dimension $w$ lies in the vertical plane of the optical axes of the finder and lens.

The rear view finder 82 as shown, has a small opening which is rectangular. However, any device permanently positioned in the common plane of the axis of the lens and of the finder by which the eye may be aligned in the same view finding plane at each use is satisfactory.

The devices by which it is insured that at all ranges, the desired and ascertained scene shall be recorded on the film within the area $abcd$ will now be described. On top of the camera near the back of its housing 10 there is mounted the usual form of rear view finder 82. The front view finder is modified in various respects from the constructions heretofore known, as will become apparent.

The front view finder comprises a sliding frame 84 formed of cylindrical rod stock and having two legs 86 and 88. The side rail 32 is provided with two vertically displaced lugs 90 and 92 having bearing holes aligned vertically with the track guide rail 15 and receiving the leg 88 of frame 84. Rail 30 provides a forwardly extending lug 94 forming a slideway 96 for the leg 86. The frame 84 has fixed thereto two pairs of spring fingers 98 and a central latching device 100 by which one of several front view finders 102 are securely fastened to the frame 84 in a plane parallel to the plane of the lens board as will hereinafter be more particularly described. The frame is urged downwardly by a helical spring 104 abutting the upper lug 90 and a collar 106 adjustably secured on leg 88. The lower end of leg 88 provides a wedge shaped follower 108 having a hardened edge.

An arm 110 is rigidly secured to the upright portion 112 of the lens board support below lug 92, extending rearwardly from the lens board face. An interposed cam and follower 114 is pivoted to arm 110 by a pin 116. The cam and cam follower 114 includes an interposed cam portion 118 having a smooth curve for engaging the cam follower portion 108 of frame 84 and an interposed cam follower portion 120 which engages either of one or more cams 122 and 124 secured in predetermined positions on the track guide rail 15. The forward faces 126 and 128 of cams 122 and 124 are the portions which play a part in this invention; the portions 130 and 132 simply guide the followers 114 as the lens board is moved into position from the collapsed position.

At this point it should be observed that as the cam follower 120 moves on the cam surface 126 the frame 88 and sight 102 is elevated or depressed as a function of the position of the lens board along the tracks. The shape of this cam surface can be determined by computation, or by measurement for any certain lens using a ground glass screen in place of the film at *abcd*. With the central axis of the windows of the view finders 82 and 102 aligned with a point on the axis of the lens at any distance away from the lens, the various positions for the edge of the follower 108 are determined and so necessarily are the points on cam surface 126. Having determined the shape of this cam for a lens of fixed focal length, the same cam shape is employed for all like lenses. It will be noted that the shapes of cam surfaces 126 and 128 are different; this is for the reason that different lenses are employed with the same camera, each having correspondingly different focal lengths. A lens of a short focal length is used, for instance with the cam 124; and a lens having a relatively long focal length is used with cam 122. Since cams 122 and 124 are fixed on the rail 115 it is clear that the operation of the range finder 50 by means of one of the focusing pieces 24 to the condition of coincidence for a particular scene to be photographed not only results in the correct setting of the lens board to give a sharp image on the film area but this activity also causes the front finder 102 to take an elevational position such that it is known to the photographer from visual sighting through these view finder windows precisely what area of the scene at that range will fall on the film area *abcd*. This device eliminates all substantial errors of registration due to parallax.

Several front view finders, 102, 102', etc. are employed. In Figs. 1 and 3 the front view finder is shown to have a large window 140 while in Figs. 2 and 5 a small window is shown. For any particular lens, the size of window 140 varies with the size of the area *abcd* on which the photographic image is duplicated. Also, if the area *abcd* is changed in position substantially, a correspondingly different front finder 102 is substituted.

Each different lens, likewise, produces an image including a larger or smaller angle at the scene. Accordingly, for each lens there are required, generally, as many front finders 102 as there are different sized or positioned areas *abcd* upon which images will be exposed. It is accordingly of importance that the front finders 102 be readily interchangeable.

The front finders 102 are each provided with a notch 144 in their lower edges and a small rectangular hole 146 thereabove. A rectangular post 148 is rigidly secured to the bridge 150 of frame 84. The thickness of post 148 is such as to snugly fit notch 144 and its height above bridge 150 is very slightly less than the height of notch 144.

To the bottom of post 148 there is secured a latch spring 156 which extends upwardly in front of an adjacent post 148 and carries a catch head 158 which is wider than hole 146 and provided with a catch nose 160 that can enter hole 146 and bear down on its lower edge to force the lower edge 154 of the finder against bridge 150 to fix its position. Catch nose 160 is disposed a distance above the top of post 148 sufficient for it to slip into hole 146 when notch 144 receives post 148, as seen in Figs. 8 and 9. Spring 156 also includes an extension finger piece 162 by which latch 100 may be released.

The stop 106 on frame 84 limits the downward movement of the frame as the cams 122 and 124 are cleared, and allows the fingers 98 and latch 100 to drop sufficiently so that the finder frame 84 enters within housing 19 when the camera is collapsed. The interposed cam and follower 114 is biased upwardly by a light spring 170 (only partly shown) such that cam 118 remains in contact with cam follower 108 in all positions of the lens board. The interposed cam and cam follower 114 functions as a latch to hold both itself and frame 84 up when 114 is raised fully against the lug 92. By this movement the follower 108 drops in front of cam 118 and prevents downward movement of cam 14.

It will be evident to those skilled in the art that the construction above described is illustrative of my invention and that other constructions may be resorted to which will achieve the results of my invention without departing from the spirit of it. For example of such other construction I desire to point out that instead of providing for the movement of the front finder 102, provisions may readily be made for shifting the rear finder 82; such provisions include cams such as 126 and 128 suitably mounted and linked to finder 82 for actuation thereof according to the range. Of course a plurality of such cams are preferably permanently attached in the mechanism and selectively provided for by suitable optional linkages so that proper registrations for the several lenses are provided for. Furthermore it is evident that such a device is also preferably actuated by shaft 52 to provide the automatic adjustment obtained in the first described arrangement. Because of the many ways of achieving substantially the same results as are achieved by my invention, I desired my Letters Patent to be limited only by the subjoined claims.

I claim:

1. Parallax correction apparatus for cameras provided with folding front boards and lens systems adjustably positioned on such boards by means of a lens carriage and a track for such carriage and wherein a lens is carried by a lens board mounted on the carriage, such apparatus comprising, in combination: a wire type finder; a sliding frame member mounted on the lens board for sliding along planes perpendicular to the optical axis of the lens mounted therein and perpendicularly to the plane of movement of the carriage and provided with a bridge portion forming a finder base; spring fingers and a latching device mounted on the bridge portion, the finder having a lower edge provided with positioning means, said latch being operative to engage with portions of said positioning means to firmly position the finder on the bridge with the optical axis of the finder in a fixed optical orientation with respect to the lens optical axis, a cam mounted on the front board adjacent the path of movement of the lens board carriage, an interponent cam pivotally mounted on the lens board carriage to receive motion from the first cam by movement of the carriage, and means causing the slide member to engage the interponent cam to effect movement of the slide member and the finder.

2. Parallax correction apparatus for cameras provided with folding front boards and lens systems adjustably positioned on such boards by means of a lens carriage and a track for such carriage and wherein a lens is carried by a lens board mounted on the carriage, such parallax correction apparatus comprising, in combination: a wire type view finder formed of flat sheet material; a sliding frame member mounted on the lens board for sliding along planes perpendicular to the optical axis of the lens mounted therein and perpendicularly to the plane of movement of the carriage and provided with a bridge portion forming a flat finder engageable surface; spring fingers and a latching device mounted on the bridge portion, the finder having a flat surface for engaging the bridge surface and having a lower edge provided with positioning means said latch being operative to engage with portions of said positioning means to firmly position the finder on the bridge with the optical axis of the finder in a fixed optical orientation with respect to the lens optical axis, a cam mounted on the front board adjacent the path of movement of the lens board carriage, an interponent cam pivotally mounted on the lens board carriage to receive motion from the first cam by movement of the carriage, and means causing the slide member to engage the interponent cam with the first cam to effect movement of the slide member and the finder in proportion to the carriage movement.

LAWRENCE E. FEAL.

REFERENCES CITED

The following references are of record in the file of this patent:

UNITED STATES PATENTS

| Number | Name | Date |
| --- | --- | --- |
| 970,443 | Hammond | Sept. 13, 1910 |
| 1,662,125 | Oscanyan | Mar. 13, 1928 |
| 1,680,647 | Stark et al. | Aug. 14, 1928 |
| 1,819,844 | Ross | Aug. 18, 1931 |
| 2,010,268 | Kuppenbender | Aug. 6, 1935 |
| 2,040,422 | Austin | May 12, 1936 |
| 2,123,494 | Barnack | July 12, 1938 |
| 2,167,436 | Hineline | July 25, 1939 |
| 2,187,093 | Peterson | Jan. 16, 1940 |
| 2,190,559 | Drenko | Feb. 13, 1940 |
| 2,211,995 | Walker | Aug. 20, 1940 |
| 2,231,734 | Ort | Feb. 11, 1941 |
| 2,261,421 | Steiner | Nov. 4, 1941 |

FOREIGN PATENTS

| Number | Country | Date |
| --- | --- | --- |
| 25,948 | Great Britain | of 1905 |